(12) United States Patent
Hanada et al.

(10) Patent No.: US 8,923,561 B2
(45) Date of Patent: Dec. 30, 2014

(54) METHOD OF DETECTING SPACE DEBRIS

(75) Inventors: Toshiya Hanada, Fukuoka (JP); Yukihito Kitazawa, Tokyo (JP); Aritsune Kawabe, Tokyo (JP)

(73) Assignees: IHI Corporation, Tokyo (JP); Kyushu University, Fukuoka-shi (JP)

( * ) Notice: Subject to any disclaimer, the term of this patent is extended or adjusted under 35 U.S.C. 154(b) by 111 days.

(21) Appl. No.: 13/821,703

(22) PCT Filed: Sep. 8, 2011

(86) PCT No.: PCT/JP2011/070478
§ 371 (c)(1),
(2), (4) Date: Mar. 8, 2013

(87) PCT Pub. No.: WO2012/033159
PCT Pub. Date: Mar. 15, 2012

(65) Prior Publication Data
US 2013/0170707 A1  Jul. 4, 2013

(30) Foreign Application Priority Data
Sep. 10, 2010  (JP) ................... 2010-203481

(51) Int. Cl.
*G06K 9/00* (2006.01)
*G06K 9/32* (2006.01)
*B64G 3/00* (2006.01)
*G06T 7/20* (2006.01)

(52) U.S. Cl.
CPC ............... *G06K 9/3233* (2013.01); *B64G 3/00* (2013.01); *G06T 7/208* (2013.01)
USPC ....................................................... 382/103

(58) Field of Classification Search
CPC ................ G06T 7/208; G06T 2207/30241; G06K 9/00496; G06K 9/0057; G06K 9/3233; G06K 9/3291; G06K 2209/21; B64G 3/00
USPC ........... 382/100, 103, 107; 348/169; 701/531, 701/300, 301
See application file for complete search history.

(56) References Cited

U.S. PATENT DOCUMENTS 6,133,997 A * 10/2000 Yamawaki et al. ....... 356/139.01
2002/0052676 A1 * 5/2002 Suzuki et al. ................ 701/13
(Continued)

FOREIGN PATENT DOCUMENTS

AU  200072495 B2  1/2002
EP  1167997 A1  1/2002
(Continued)

OTHER PUBLICATIONS

Yasaka, T., et al., "Modeling of Space Debris Environment," Journal of the Society of Instrument and Control Engineers, vol. 41, No. 8, pp. 558-563, (Aug. 10, 2002) (with English abstract).
(Continued)

*Primary Examiner* — Andrew W Johns
(74) *Attorney, Agent, or Firm* — Oblon, Spivak, McClelland, Maier & Neustadt, L.L.P.

(57) ABSTRACT

A method of detecting space debris includes: generating a virtual space debris in accordance with the law of conservation of mass by applying a debris breakup model to an object of breakup origin; calculating an orbit of each virtual space debris based on a debris orbit propagation model; and generating appearance frequency distribution of a motion vector of each virtual space debris on the celestial sphere based on the orbit calculation. The above operations are executed multiple times. The method further includes setting a search range vector based on a motion vector having a high level of the appearance frequency distribution of the motion vector, and applying a stacking method to regions in images captured at time intervals during the fixed point observation, the regions being shifted along the search range vector sequentially in the order of capture, thereby detecting space debris appearing on the images.

12 Claims, 10 Drawing Sheets

(56) References Cited

U.S. PATENT DOCUMENTS

| | | | |
|---|---|---|---|
| 2003/0202682 A1* | 10/2003 | Yanagisawa et al. | 382/103 |
| 2006/0110007 A1* | 5/2006 | Yanagisawa et al. | 382/103 |
| 2011/0196550 A1* | 8/2011 | Carrico et al. | 701/13 |
| 2012/0225725 A1* | 9/2012 | Velasco-Tang et al. | 463/42 |

FOREIGN PATENT DOCUMENTS

| | | | | |
|---|---|---|---|---|
| FR | 2814816 A1 | 4/2002 | | |
| JP | 2002 139319 A | 5/2002 | | G01C 1/00 |
| JP | 2003 323625 A | 11/2003 | | G06T 7/20 |
| JP | 2008 14691 A | 1/2008 | | G01B 11/00 |
| RU | 2204508 C1 | 5/2003 | | |

OTHER PUBLICATIONS

International Search Report Issued Oct. 11, 2011 in PCT/JP11/70478 Filed Sep. 8, 2011.

Decision on Grant issued Aug. 6, 2014 in Russian Patent Application No. 2013115416/08(022891) (with English Translation).

* cited by examiner

METHOD OF DETECTING SPACE DEBRIS

TECHNICAL FIELD

The present invention relates to a method of detecting space debris on a geocentric orbit.

BACKGROUND ART

Space debris is an artificial object which is orbiting in geocentric orbits without being used. Examples of space debris include: spacecrafts (artificial satellites, space stations, space shuttles, and the like) which terminated operations due to end of lives, accidents and failures; bodies and components of rockets used to launch artificial satellites; fragments generated in stage separation of multistage rockets; tools dropped by astronauts during extravehicular activities; and the like. Moreover, the space debris also includes minute debris generated by space debris colliding with each other and being crushed into pieces. Accordingly, there are various sizes of space debris.

Detection of the space debris is important in achieving smooth operations of spacecrafts (artificial satellites, space stations, space shuttles, and the like). One of conventional methods of detecting space debris is a method of identifying existence of space debris by extracting a high-luminance portion in images captured with a CCD camera from the globe or on an orbit.

In this method, from three or more images captured at time intervals, images of regions in the same size are cut out in line with a motion (a vector direction and a scalar quantity) of a moving object such as space debris, and a stacking method is applied to the cut-out images. To be more precise, the cut-out images are stacked on one another and the median value or average value of pixel values is calculated for each pixel of the cut-out images. Then, each pixel having the calculated median value or average value being equal to or above a predetermined value is extracted as a pixel representing existence of the moving object (see PTL 1, for example).

CITATION LIST

Patent Literature

[PTL 1] JP 2003-323625 A

SUMMARY OF INVENTION

Technical Problem

When the space debris is detected from the multiple images captured at time intervals by using the stacking method as described above, the cut-out regions from the respective images have to be shifted corresponding to the motion of the space debris during the time intervals for capturing the images, and be stacked so that pieces of the space debris, which is the detection target appearing on the respective images, are properly stacked on one another. However, the motion (the vector direction and the scalar quantity) of the space debris being the detection target is not usually known in advance.

For this reason, the cut-out regions from the images for properly stacking the pieces of the space debris as the detection target have to be found out by repeating trial and error while the cut-out region from the images is shifted in various directions and in various amounts. Such trial and error requires a tremendous amount of processing, which may consume such a long time as months or years if a general-purpose computer is used.

Accordingly, the fact is that space debris appearing on multiple images of an observation space captured at time intervals cannot be easily detected from the multiple images by means of image processing.

In consideration of the above-mentioned circumstances, an object of the present invention is to provide a method of detecting space debris, which is capable of detecting space debris efficiently with simple processing from multiple images of an observation space captured at time intervals.

Solution to Problem

An aspect of the present invention is a method of detecting space debris on a geocentric orbit, the space debris appearing on a plurality of images captured at time intervals during fixed point observation. The method comprises: an object identification step of identifying an object of breakup origin which is likely to have broken up on the geocentric orbit in the past; a virtual debris generation step of generating a virtual space debris piece in accordance with the law of conservation of mass by applying a debris breakup model to the object of breakup origin identified in the object identification step; an orbit calculation step of applying a debris orbit propagation model to each virtual space debris piece generated in the virtual debris generation step, thereby calculating an orbit of the virtual space debris piece during the fixed point observation; a motion vector distribution generation step of generating appearance frequency distribution of a motion vector of each virtual space debris piece on the celestial sphere during the fixed point observation on the basis of a result of the orbit calculation in the orbit calculation step; a motion vector estimation step of estimating the motion vector of the space debris piece on the images on the basis of a motion vector having a high level in the appearance frequency distribution on the basis of cumulative distribution of a plurality of appearance frequency distribution results of the motion vector obtained by performing the virtual debris generation step, the orbit calculation step, and the motion vector distribution generation step a plurality of times; and a detection step of cross-checking pieces of pixel information on respective regions in the images captured at time intervals during the fixed point observation, the regions shifted in a direction and in an amount of the estimated motion vector sequentially in the order of capture, thereby detecting space debris on the geocentric orbit appearing on the images.

The method of detecting space debris may further comprise: a search range vector setting step of setting a search range vector on the basis of the estimated motion vector, the search range vector indicating a direction of motion and an amount of motion of a search range for the space debris appearing on the images, wherein the detection step may include applying a stacking method to respective regions in the images captured at time intervals during the fixed point observation, the regions being shifted in a direction and in an amount of the set search range vector sequentially in the order of capture, thereby detecting space debris on the geocentric orbit appearing on the images.

The orbit calculation step may include a time-based orbit calculation step of performing the orbit calculation of each virtual space debris piece generated in the virtual debris generation step for each of time points at regular time intervals in a period from start to end of the fixed point observation. The motion vector distribution generation step may generate the appearance frequency distribution of the motion vector on the basis of a result of the orbit calculation at the time points in the time-based orbit calculation step.

The method of detecting space debris may further comprise: a debris distribution generation step of generating existence probability distribution of each virtual space debris piece on the celestial sphere during the fixed point observation on the basis of the result of the orbit calculation in the orbit calculation step; and a capturing space setting step of setting a space including a region having a high level in the existence probability distribution of the virtual space debris piece on the celestial sphere during the fixed point observation as a space for capturing the images during the fixed point observation, on the basis of cumulative distribution of a plurality of existence probability distribution results obtained by performing the virtual debris generation step, the orbit calculation step, and the debris distribution generation step a plurality of times, wherein the images are obtained by capturing the set capturing space at time intervals.

The orbit calculation step may include a time-based orbit calculation step of performing the orbit calculation of each virtual space debris piece generated in the virtual debris generation step for each of time points at regular time intervals in a period from start to end of the fixed point observation. The debris distribution generation step may include: an existing position calculation step of calculating an existing position of each virtual space debris piece on the celestial sphere at each time point on the basis of the result of the orbit calculation at the time point in the time-based orbit calculation step; and an existence probability distribution generation step of generating existence probability distribution of each virtual space debris piece on the celestial sphere during the fixed point observation on the basis of the result of the calculation in the existing position calculation step.

Advantageous Effects of Invention

According to the present invention, space debris can be detected efficiently with simple processing from multiple images of an observation space captured at time intervals during fixed point observation.

DESCRIPTION OF EMBODIMENTS

Figure 1:
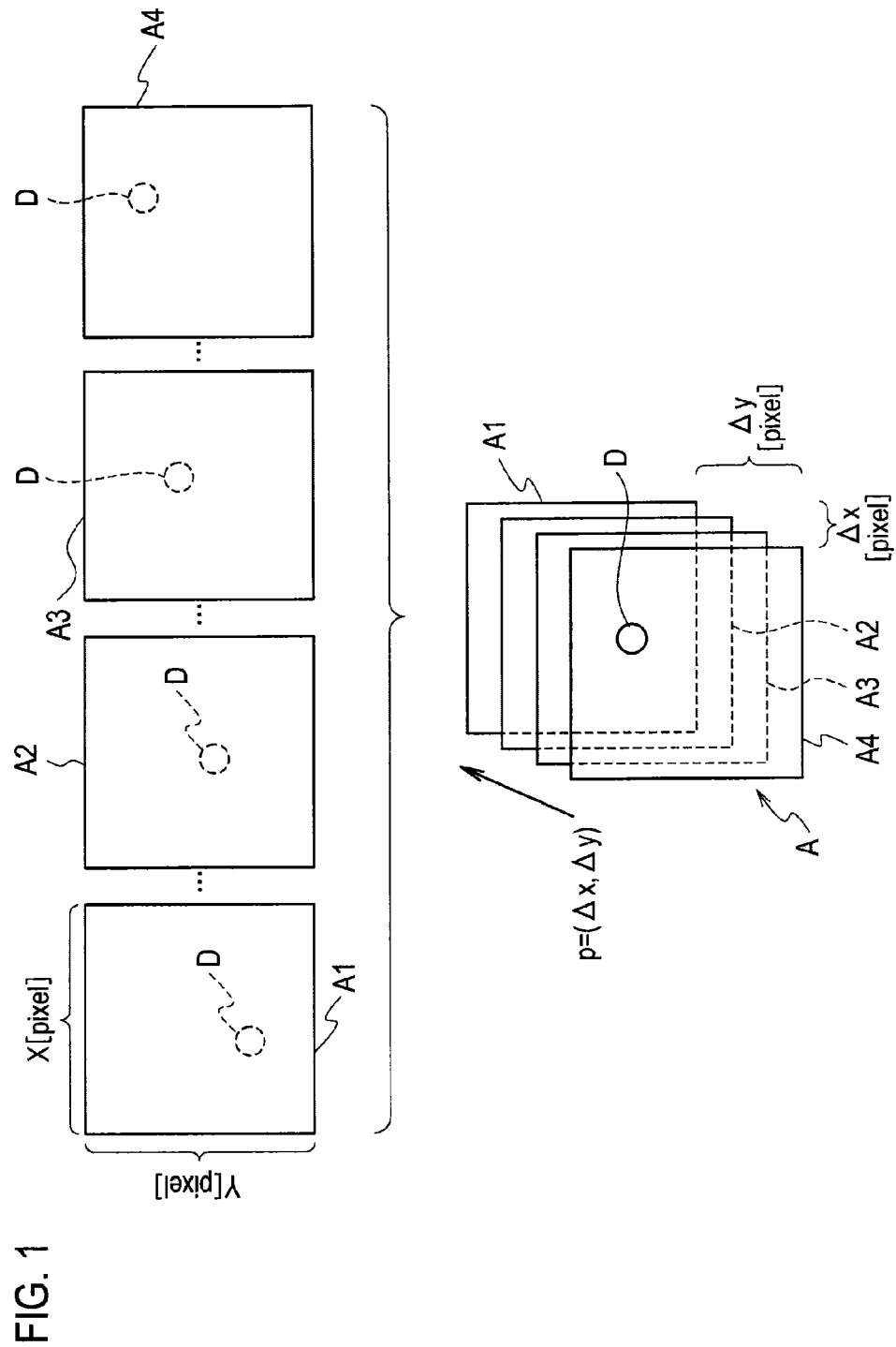
FIG. 1 is an explanatory view showing an outline of processing for detecting space debris employing a stacking method.

An embodiment of the present invention will be described below with reference to the drawings.

First of all, as a typical example of processing for detecting space debris from multiple images captured at time intervals by means of image processing, a basic concept of space debris detection processing employing the stacking method will be described with reference to an explanatory view of FIG. 1.

Optical observation from the ground is widely used as a method of detecting space debris on the geostationary orbit. Images captured at the time of observation are subjected to image processing and space debris is detected by distinguishing the space debris from the background based on brightness. However, dark space debris having a very small brightness difference and hence being indistinguishable from the background may exist on the images. The stacking method has been known as a method capable of detecting such dark space debris.

Here, a space debris piece D being a detection target is assumed to have low brightness that is too dark to be detected with a single image. As shown in an explanatory view of FIG. 1, in the stacking method, multiple images A1 to A4 are captured at short time intervals during fixed point observation with a CCD camera or the like in such a manner that the space debris piece D appears as a linearly moving object. Here, as shown in FIG. 1, each of the images A1 to A4 is assumed to have the image size of X [pixels] in the horizontal direction and Y [pixels] in the vertical direction. Then, a motion vector p (=Δx [pixel], Δy [pixel]) of the space debris piece D corresponding to the intervals of capturing the images A1 to A4 is assumed and the multiple images A1 to A4 are stacked on one another in chronological order in accordance with the motion vector p. In other words, the images A1 to A4 are stacked on one another while being shifted sequentially in the amount corresponding to the motion vector p of the space debris piece D.

Then, average values of brightness in the images A1 to A4 are calculated in order to synthesize a single image A. Here, main elements constituting the brightness of the background are noise components. In the synthesized image A, the noise components of the background are smoothed whereby the brightness of the background is reduced. Thus, the space debris piece D as the detection target can be distinguished from the background based on the brightness. The space debris piece D can be detected from the multiple captured images A1 to A4 by the series of procedures described above.

For example, if a bright stationary object such as a fixed star appears on the images A1 to A4, images of the object are not stacked on one another in the same positions of the stacked images A1 to A4. Accordingly, the brightness of the pixels where the images of the fixed star or the like appear is reduced in the course of the synthesis of the single image A as a result of averaging with the background. Thus, the brightness of the space debris piece D that appears in the same positions of the stacked images A1 to A4 is higher than the brightness of the background.

In the meantime, a critical point of the stacking method is the necessity to assume the motion vector p of the space debris piece D. Since the space debris piece D has various moving directions and amounts on the images, the motion vector p cannot be assumed as one value and it is therefore necessary to determine a search region defined by two variates ($\Delta x$, $\Delta y$) which are the components of the motion vector p.

There has been no method for appropriately assuming the search region for the motion vector p of the indistinguishably dark space debris piece D from a single image. Accordingly, as shown in FIG. 2, a search region Sa required in the case of not employing debris modeling needs to have a search region defined by the motion vector p having twice as large as a capturing size (X, Y) of a single image at a maximum.

A search for the space debris piece D in the search region of this size requires an unrealistic time frame for analysis. Several months to several years are usually required for performing analytic processing on a large amount of captured images acquired in one night by using one general-purpose computer while employing the search region in the above-described size.

Figure 2:
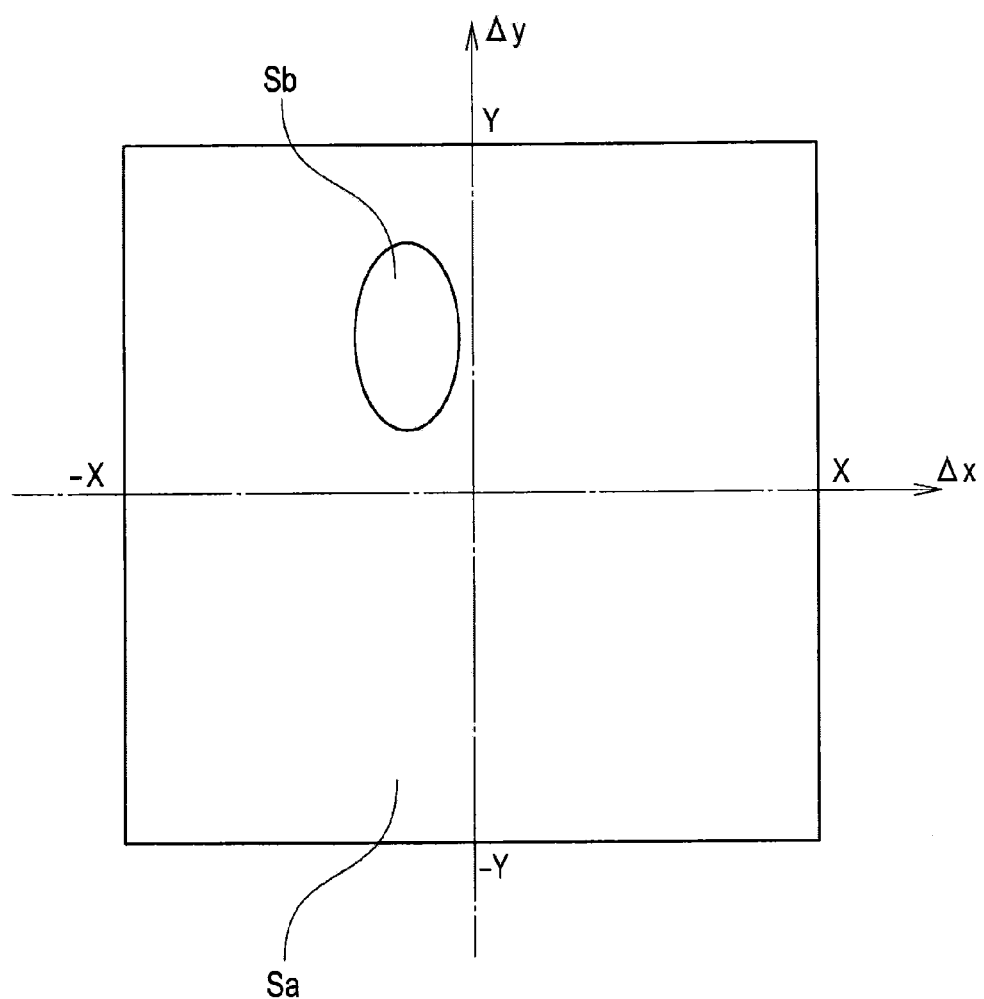
FIG. 2 is an explanatory view showing an expected range of a motion vector of the space debris necessary for performing the detection processing of FIG. 1.

A method of detecting space debris according to an embodiment of the present invention to be described below appropriately estimates the motion vector p of the space debris piece D by employing debris modeling techniques (a debris breakup model and a debris orbit propagation model), and drastically narrows down the search region for the motion vector p as shown in FIG. 2 as a search region Sb to be required at the time of employing debris modeling.

The time necessary for the analytic processing is proportional to the area of the search region for the motion vector p. Accordingly, the time for analysis can be reduced to several percent of the time required at the time of not employing debris modeling at a maximum by adopting the detection method of the embodiment to be described below. As a consequence, the analysis only requires a realistic time frame, whereby debris having low brightness can be detected by analyzing a large amount of observation images taken in several days within a limited time frame using a few general-purpose computers.

Figure 3:
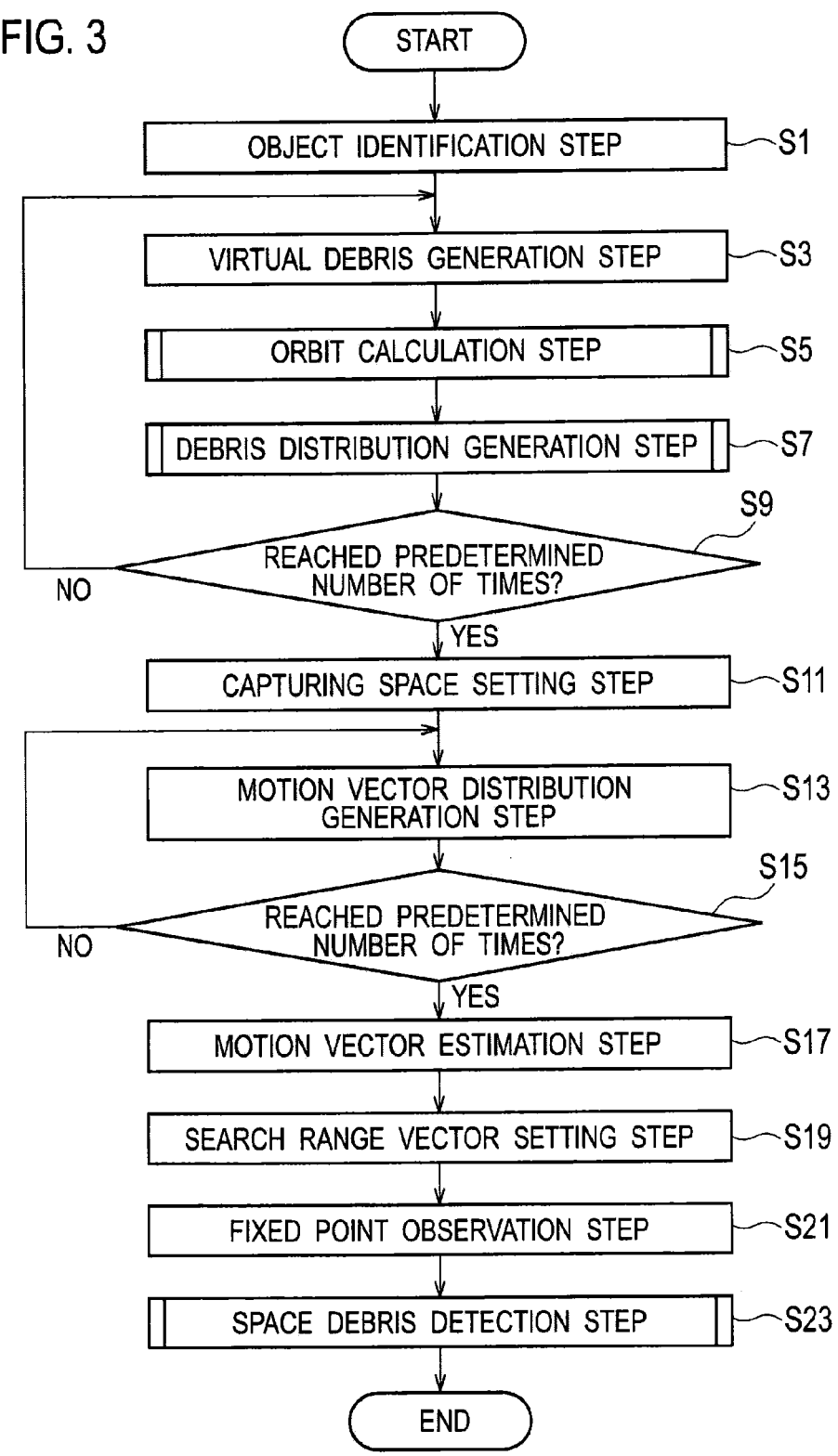
FIG. 3 is a flowchart showing procedures of a method of detecting space debris according to an embodiment of the present invention.

To this end, the method of detecting space debris according to the embodiment sequentially executes an object identification step (step S1), a virtual debris generation step (step S3), an orbit calculation step (step S5), and a debris distribution generation step (step S7) as shown in a flowchart of FIG. 3. Here, the virtual debris generation step and the subsequent steps are repeatedly executed in accordance with Monte Carlo simulation until the number of repetitions is confirmed (YES) to have reached a predetermined number of times (such as 60 times) in step S9.

Moreover, in the method of detecting space debris according to the embodiment, a capturing space setting step (step S11) is executed after the virtual debris generation step and the subsequent steps are repeatedly executed for the predetermined number of times (YES in step S9).

In addition, in the method of detecting space debris according to the embodiment, after the capturing space setting step is executed in step S11, a motion vector distribution generation step (step S13) is repeatedly executed in accordance with Monte Carlo simulation until the number of repetitions is confirmed (YES) to have reached a predetermined number of times (such as 60 times) in step S15.

Then, after the motion vector distribution generation step in step S13 is repeatedly executed for the predetermined number of times (YES in step S15), a motion vector estimation step (step S17), a search range vector setting step (step S19), a fixed point observation step (step S21), and a space debris detection step (step S23) are executed.

Among these steps, an object of breakup origin, which is likely to have broken up on a geocentric orbit in the past, is identified in the object identification step in step S1. To be more precise, a list of objects (spacecrafts), which are likely to have broken up in the past, is made from publicly released documents and the like. Then, the object of breakup origin is identified therefrom.

Next, in the virtual debris generation step in step S3, a debris breakup model is applied to the listed object of breakup origin to generate a virtual space debris piece D in accordance with the law of conservation of mass. The debris breakup model includes a series of function expressions for calculating the size, area-to-mass ratio, average cross-sectional area, mass, and ejection velocity of a fragment (the virtual space debris piece D) to be ejected when an artificial object (a spacecraft) orbiting around the earth suffers a breakup event such as an explosion or a collision. The NASA standard breakup model adopted by the National Aeronautics and Space Administration (NASA) can be used as the debris breakup model.

In the above-described debris breakup model, if the mass of the artificial object orbiting around the earth is known in advance, then the size of the fragment that is likely to be generated is uniquely calculated from a size distribution model of the breakup model.

Meanwhile, in the above-described debris breakup model, an area-to-mass ratio distribution model is a function of the size. However, since a range of the area-to-mass ratio and a probability density are defined as superposition of two normal distribution factors, the area-to-mass ratio cannot be uniquely calculated. Accordingly, the area-to-mass ratio is determined by using random numbers generated in consideration of the range of the area-to-mass ratio and the probability density.

Further, in the above-described debris breakup model, the average cross-sectional area is uniquely defined as a function of the size. The mass of the fragment is calculated by dividing the average cross-sectional area by the area-to-mass ratio.

The determination of the area-to-mass ratio, the identification of the average cross-sectional area by using the determined area-to-mass ratio in the function of the size, and the calculation of the mass of the fragment using the determined area-to-mass ratio and the identified average cross-sectional area are repeated until the gross mass of the fragments reaches the mass of the artificial object. Accordingly, assuming that the mass of the object of breakup origin is M and a mass of a virtual space debris piece i is $m_i$, the number N of the fragments to be generated, namely the virtual space debris pieces i, is equal to a value that satisfies the following formula (where i=1, 2, 3, . . . , N):

$$M = m_1 + m_2 + m_3 \ldots + m_N$$

Meanwhile, in the above-described debris breakup model, an ejection velocity distribution model is a function of the area-to-mass ratio. However, since a range of the ejection velocity of the fragment and the probability density are defined as single normal distribution, the ejection velocity cannot be uniquely calculated. Accordingly, the ejection velocity is determined by using random numbers generated in consideration of the range of the ejection velocity and the probability density as in the determination of the area-to-mass ratio.

The virtual space debris, which has parameters of a position vector and a velocity vector in the inertial space, a characteristic length (size), the area-to-mass ratio, the mass, and the average cross-sectional area, is generated by the aforementioned procedures.

The orbit calculation step in step S5 is executed for calculating the geocentric orbit during fixed point observation of the virtual space debris piece D. Specifically, for a period from estimated start time to estimated end time of the fixed point observation, an orbit (a trajectory) where each virtual space debris piece D forecasted in step S3 exists is found by calculation using an orbit propagation model.

Figure 4:
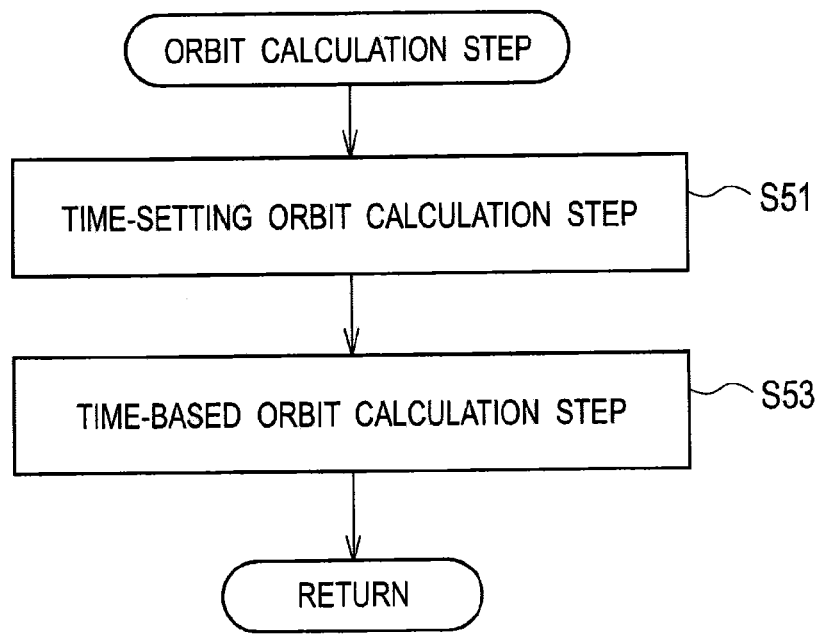
FIG. 4 is a flowchart showing procedures of an orbit calculation step in FIG. 3.

As shown in a flowchart of FIG. 4, the orbit calculation step includes a time-setting orbit calculation step (step S51) and a time-based orbit calculation step (step S53).

In the time-setting orbit calculation step in step S51, orbit calculation is performed for each virtual space debris piece D generated in step S3 for a period from the point of breakup to the estimated start time of the fixed point observation. Meanwhile, in the time-based orbit calculation step in step S53, orbit calculation is performed for each virtual space debris piece D on the basis of time points (time steps) at regular time intervals for the period from the estimated start time of the fixed point observation, for which the orbit calculation is performed instep S51, to the estimated end time of the fixed point observation. In this embodiment, the time points respectively correspond to the times for capturing the images A1 to A4 of the observed space at time intervals during the fixed point observation.

The debris distribution generation step in step S7 of FIG. 3 is performed in order to determine which space on the celestial sphere is to be captured during the fixed point observation in the capturing space setting step in step S11 to be described later. To be more precise, existence probability distribution of the virtual space debris piece D, which represents a position on the celestial sphere where the virtual space debris piece D exists during the fixed point observation, is generated in this step.

Figure 5:
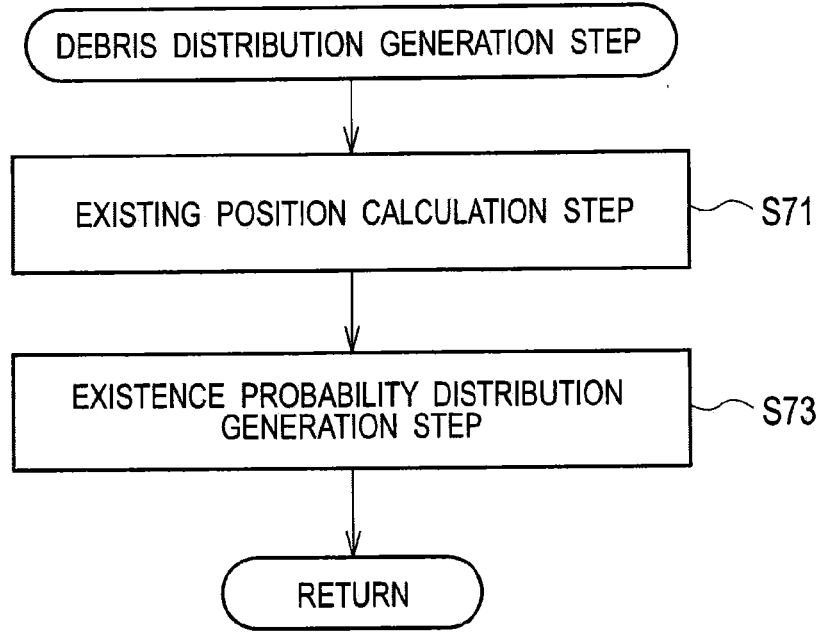
FIG. 5 is a flowchart showing procedures of a debris distribution generation step in FIG. 3.

As shown in a flowchart of FIG. 5, the debris distribution generation step includes an existing position calculation step (step S71) and an existence probability distribution generation step (step S73).

In the existing position calculation step in step S71, the existing positions of each virtual space debris piece D on the celestial sphere at the respective time points during the fixed point observation are calculated on the basis of a result of the orbit calculation for each virtual space debris piece D at the time points at regular time intervals in the period from the estimated start time to the estimated end time of the fixed point observation calculated in step S53 of FIG. 4.

Specifically, the existing position (in terms of a distance, right ascension, and declination from the origin of a coordinate system) of each virtual space debris piece D on the celestial sphere during the fixed point observation is calculated by subjecting the position vector and the velocity vector of each virtual space debris piece D at each time point obtained by the orbit calculation in step S53 to coordinate transformation from the earth-centered inertial coordinate system to the equatorial plane coordinate system.

Existence probability distribution of the existing position of the space debris piece D on the celestial sphere calculated in step S71 is generated in the existence probability distribution generation step in step S73. To be more precise, a histogram shown in an explanatory view of FIG. 6 is formed in regard to two variates, namely, the right ascension and the declination, of the existing positions of the virtual space debris piece D on the celestial sphere during the fixed point observation calculated in step S71.

Figure 6:
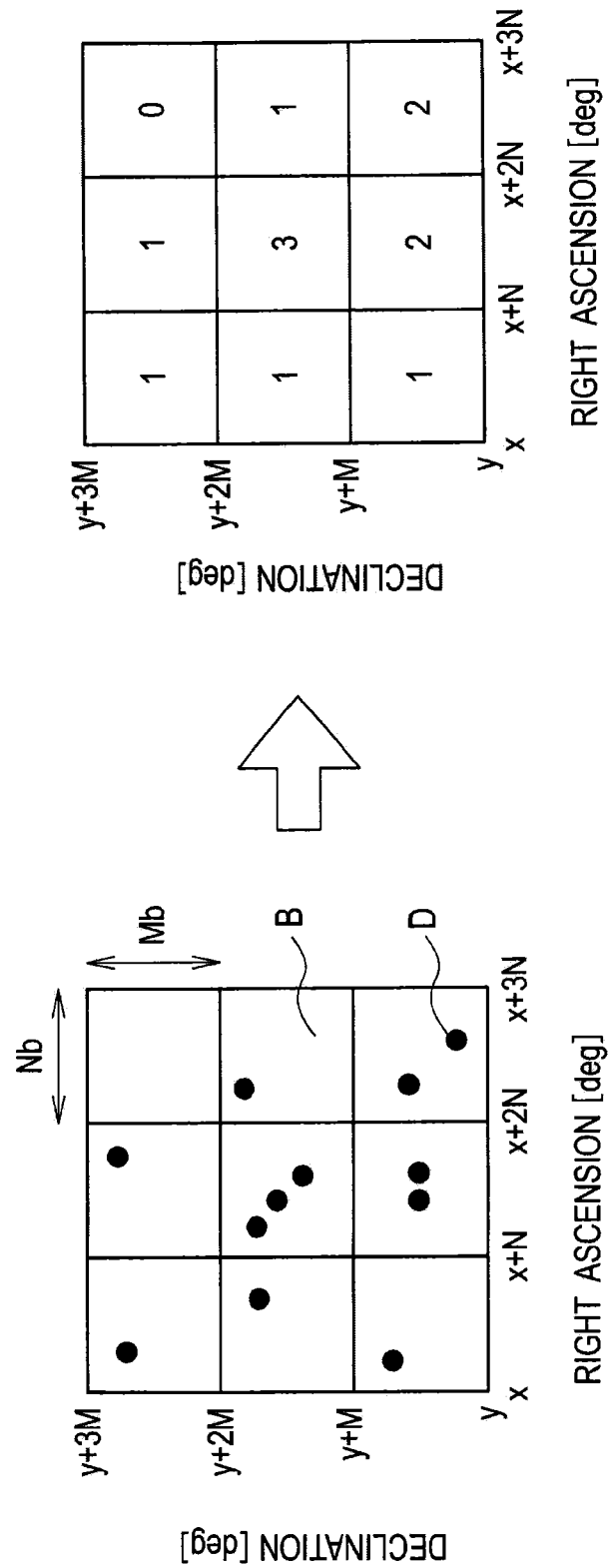
FIG. 6 is an explanatory view of a bivariate histogram showing distribution of virtual space debris in directions of right ascension and declination, which is carried out when existence probability distribution of FIG. 8 is generated.

The bivariate histogram of FIG. 6 is provided with nine (3×3) bins B by indicating the variate of the declination in the direction of the vertical axis, indicating the variate of the right ascension in the direction of the horizontal axis, and separating each variate range into three sections. Each bin B is assumed to have a bin size of Nb×Mb. Then, the number of the virtual space debris pieces D located in each of the bins B in the bivariate histogram of FIG. 6 is counted for each of the time points during the fixed point observation on the basis of the existing positions of the virtual space debris pieces D calculated in step S71. The existence probability distribution of the virtual space debris pieces D on the celestial sphere during the fixed point observation is generated by forming the histogram as describe above. The generated existence probability distribution is used in the capturing space determination step in step S11 of FIG. 3 to be described later.

Here, the size of the histogram of the right ascension and the declination having 3×3=9 bins B described above may be aligned, for example, with the field of view of the CCD camera or the like used for capturing the images A1 to A4.

Figure 7:
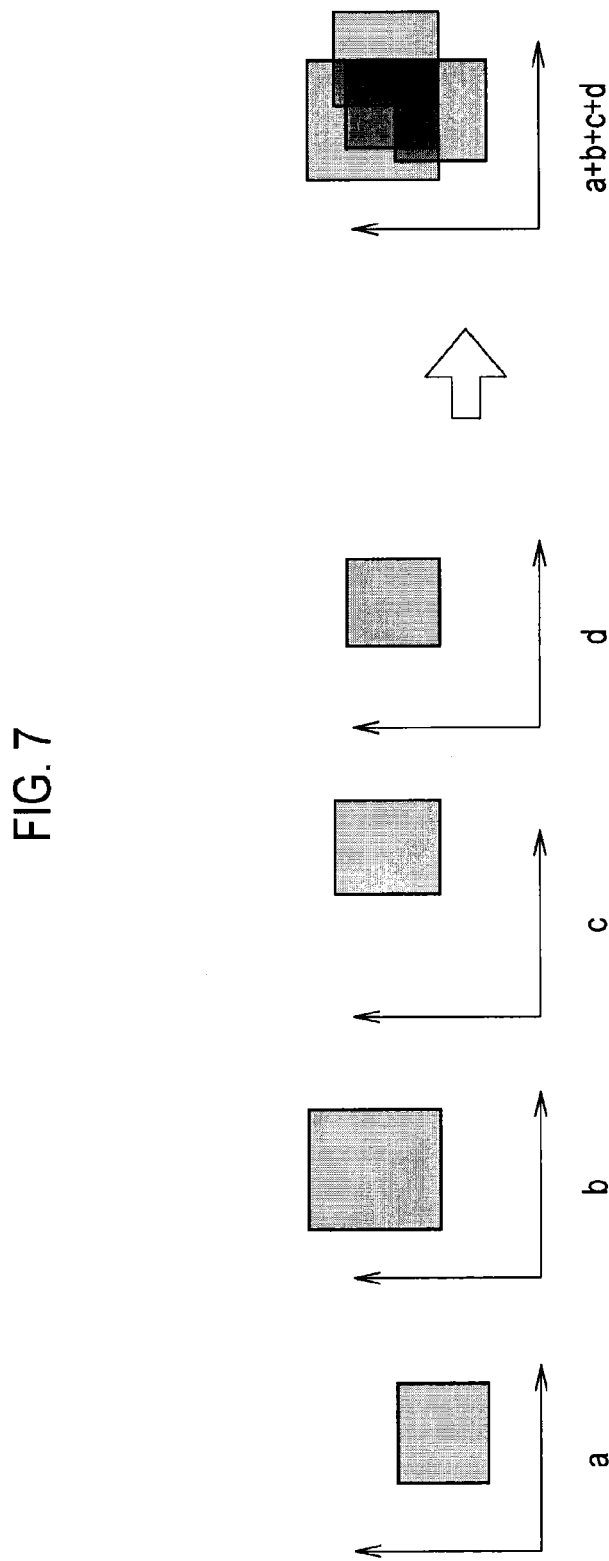
FIG. 7 is an explanatory view showing procedures for synthesizing the distribution of the virtual space debris by using the bivariate histograms in FIG. 6, which are generated multiple times in accordance with Monte Carlo simulation.

Cumulative distribution of the existence probability distribution of the virtual space debris piece D on the celestial sphere during the fixed point observation, which has been generated a predetermined number of times in step S73 of FIG. 5, is found in the capturing space setting step in step S11 of FIG. 3. An explanatory view of FIG. 7 shows an example of accumulating four generated existence probability distribution patterns a to d. After accumulation, the cumulative distribution of the space debris pieces D on the celestial sphere can be obtained, for example, by normalization in which the values of the respective bins B are divided by a representative value such as a maximum value of all the bins B.

As described above, this embodiment has shown an example of executing the debris distribution generation step in step S7 of FIG. 3 by numerical approach. Specifically, the embodiment has described the contents of numerically calculating the existence probability of the virtual space debris pieces D and finding the distribution thereof by using the histogram. However, the debris distribution generation step (step S7) may also be executed by analytical approach. Specifically, it is possible to analytically calculate the time when the virtual space debris piece D flies across a location at specific right ascension and declination, and to find the existence probability distribution of the virtual space debris piece D on the celestial sphere based on a result of the calculation.

Figure 8:
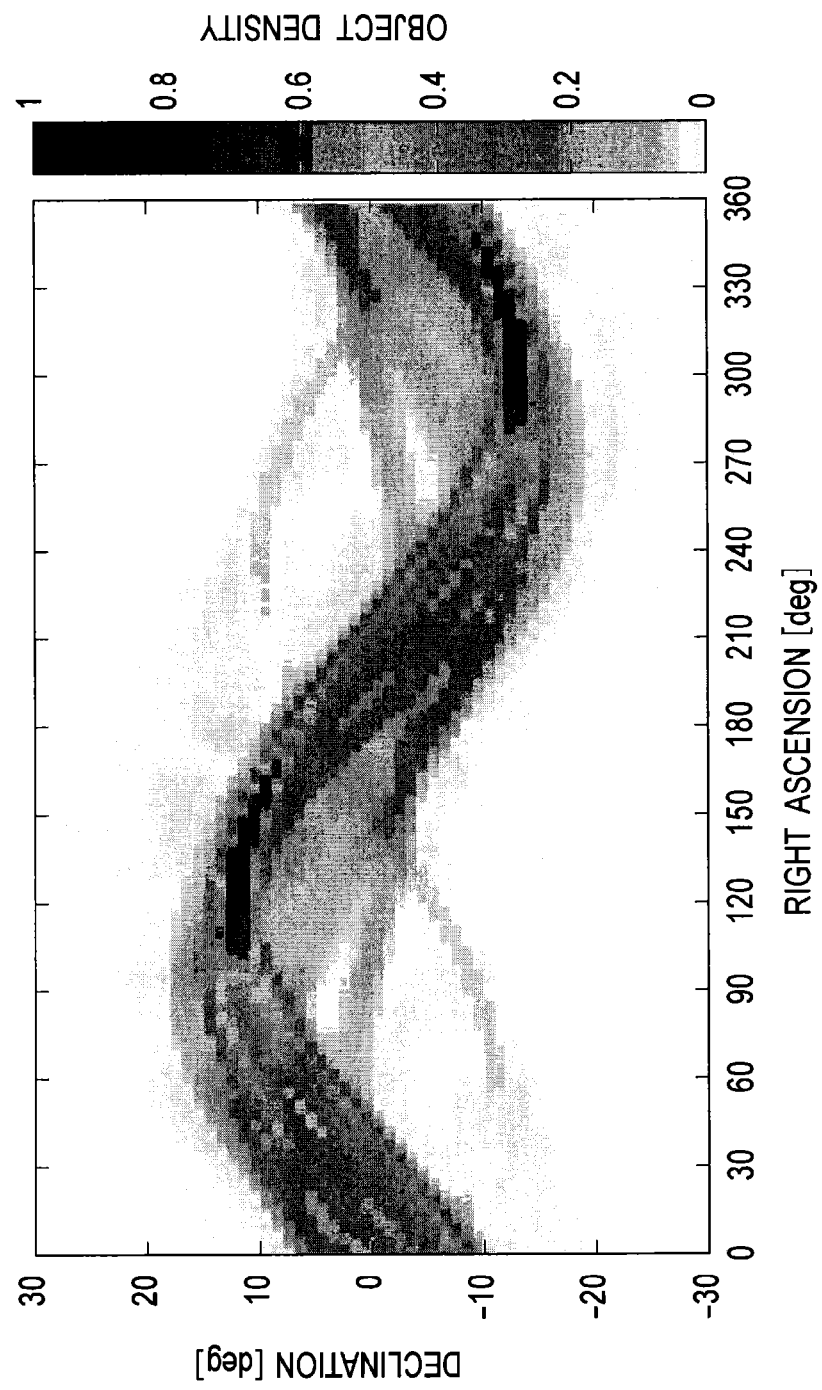
FIG. 8 is an explanatory view showing existence probability distribution of the virtual space debris on the celestial sphere during fixed point observation, which is obtained by the synthesis shown in FIG. 7.

FIG. 8 is an explanatory view showing the existence probability distribution of the virtual space debris piece D on the celestial sphere obtained by modeling the cumulative distribution of the existence probability distribution of the virtual space debris piece D on the celestial sphere during the fixed point observation found as described above. In the explanatory view, the depth of a color shown in a scale on the right side indicates levels in the existence probability distribution of the virtual space debris piece D.

Accordingly, in the capturing space setting step in step S11 of FIG. 3, a space (in terms of the right ascension and the declination) including a region in the explanatory view of FIG. 8, where the existence probability distribution of the virtual space debris piece D is high, as a space for capturing the images A1 to A4 during the fixed point observation. Thus, it is possible to increase probabilities of appearance of actual space debris pieces D in the images A1 to A4 captured during the fixed point observation. Here, it is preferable to set the capturing space in such a manner as to exclude an extremely bright celestial object from the capturing space. In addition, the capturing space is preferably set in consideration of restrictions of the field of view, in the light of an elevation angle and an azimuth angle, of an observatory where the fixed point observation takes place.

The motion vector distribution generation step in step S13 of FIG. 3 is performed in order to determine a range, in which the virtual space debris piece D is likely to move on the images A1 to A4 captured during the fixed point observation, in the search range vector setting step in step S19 to be described later. Specifically, appearance frequency distribution of the motion vector p of each virtual space debris piece D during the fixed point observation is generated in this step.

In the motion vector distribution generation step, the appearance frequency distribution of the motion vector possessed by the space debris piece D is generated in regard to each virtual space debris piece D existing in the space for capturing the images A1 to A4 during the fixed point observation set in step S11 of FIG. 3, the space being selected from the existing positions of the virtual space debris piece D on the celestial sphere at the respective time points during the fixed point observation calculated in step S71 of FIG. 5.

Specifically, the motion vector p of each virtual space debris piece D in the images A1 to A4 is calculated by subjecting the result of calculation in step S53 of FIG. 4 to a series of procedures of: the earth-centered inertial coordinate system; the earth-centered fixed coordinate system; the equatorial plane coordinate system; acquisition of time integral regarding latitude and longitude of a point located immediately below; and scale conversion. The motion vector p thus calculated shows distribution which is developed on a graph shown in FIG. 9. In the graph, the horizontal axis indicates X-direction components (X Shift [px]) of the motion vector p and the vertical axis indicates Y-direction components (Y Shift [px]).

Then, the motion vector distribution generation step in step S13 of FIG. 3 is repeated until the number of repetitions is confirmed (YES) to have reached a predetermined number of times in step S15. Thus, cumulative distribution of the appearance frequency distribution of the motion vector p possessed by each virtual space debris piece D existing in the space for capturing the images during the fixed point observation is obtained as shown in a graph in FIG. 10.

Figure 9:
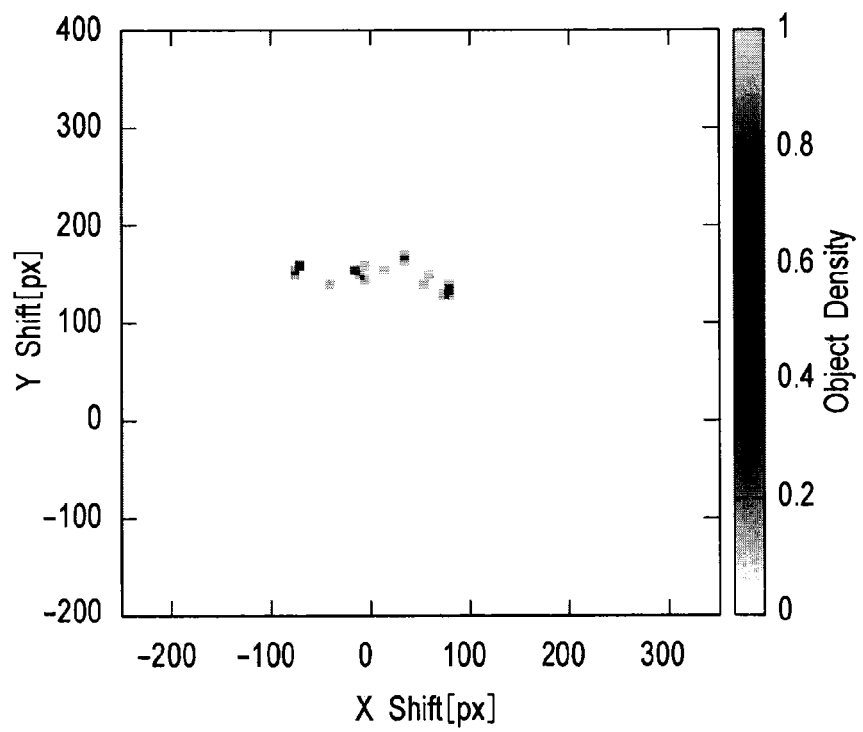
FIG. 9 is a graph showing a distribution example in the case where the existence probability distribution of the virtual space debris is generated only once by using the bivariate histogram in FIG. 6.
Figure 10:
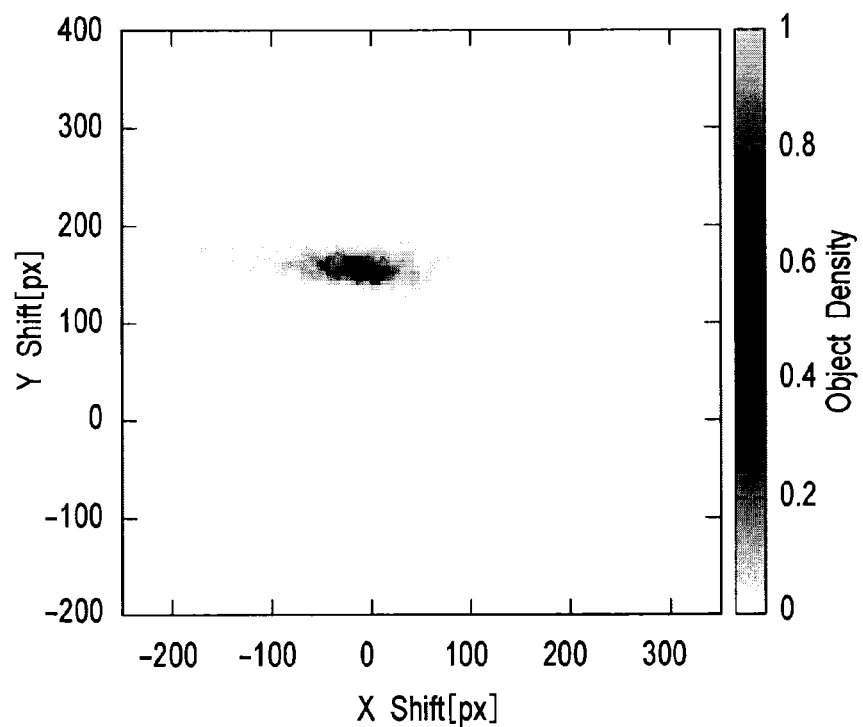
FIG. 10 is a graph showing a distribution example in the case where the existence probability distribution of the virtual space debris is generated multiple times in accordance with the Monte Carlo simulation by using the bivariate histogram in FIG. 6.

In each of the graphs in FIG. 9 and FIG. 10, the depth of a color shown in a scale on the right side indicates levels in the appearance frequency distribution of the motion vector p.

Next, in the motion vector estimation step in step S17 of FIG. 3, the motion vector p of the virtual space debris piece D is estimated from a region (in terms of X Shift [px] and Y Shift [px]) having a high level of the appearance frequency distribution of the motion vector p in the graph in FIG. 10.

In the subsequent search range vector setting step in step S19 of FIG. 3, the motion vector p estimated in the motion vector estimation step in step S17 is set as a search range vector which indicates a vector component in the search region Sb in FIG. 2 (i.e., the search region required at the time of employing debris modeling).

Figure 11:
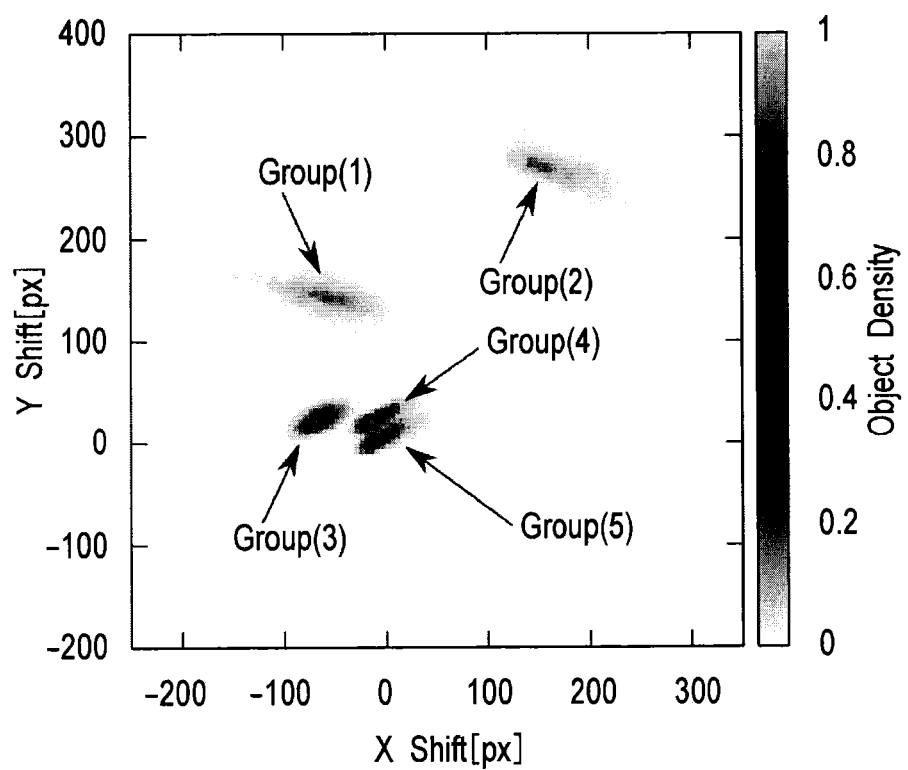
FIG. 11 is a graph showing a distribution example in the case where the existence probability distribution of the virtual space debris generated multiple times in accordance with the Monte Carlo simulation shows distribution that is dispersed into multiple groups.

Incidentally, when there are multiple objects of breakup origin identified in the object identification step in step S1, distribution of the motion vector p of each virtual space debris piece D is formed into a group corresponding to each of the objects of breakup origin as shown in a graph in FIG. 11. In this case, a space including a region of a certain group having the highest level of the appearance frequency distribution of the motion vector p may be set as the search range. Hence, the actual space debris piece D generated from the object of breakup origin corresponding to the certain group is defined as a detection target.

In the fixed point observation step in step S21 of FIG. 3, the fixed point observation takes place while defining a capturing range set in step S11 as the capturing space preferably in the period from the estimated start time to the estimated end time described above. Specifically, the images A1 to A4 are captured at regular time intervals during the fixed point observation in the period from the estimated start time to the estimated end time.

Figure 12:
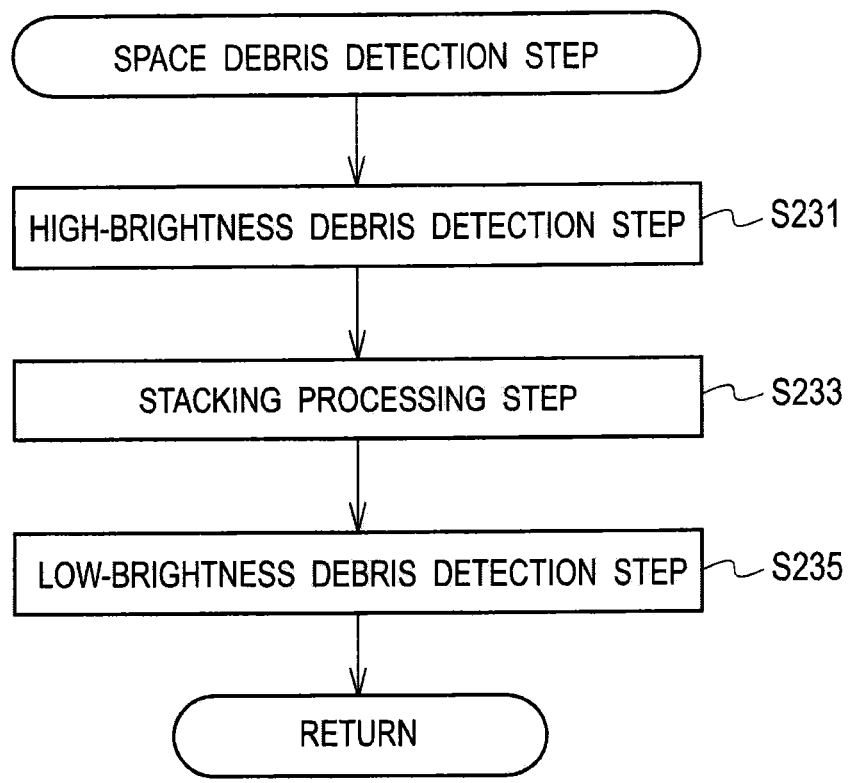
FIG. 12 is a flowchart showing procedures of a space debris detection step in FIG. 3.

As shown in a flowchart in FIG. 12, the subsequent space debris detection step in step S23 includes a high-brightness debris detection step (step S231), a stacking processing step (step S233), and a low-brightness debris detection step (step S235).

In the high-brightness debris detection step in step S231, a space debris piece having high brightness which is detectable by a general, high-speed processing, and publicly known image analysis method, or a publicly known space debris piece which has already been registered with a database of orbiting objects managed, owned, and disclosed by the United States, is detected from the multiple images A1 to A4 captured at regular time intervals in the course of the fixed point observation step in step S21 of FIG. 3.

In the stacking processing step in step S233, the actual space debris piece D appearing on the images A1 to A4 is detected by stacking the images A1 to A4 on one another in the order of capture while sequentially shifting the images in the direction and in the amount indicated by the search range vector set in the step S19, and employing the stacking method in accordance with the procedures described in the beginning with reference to FIG. 1.

In the low-brightness debris detection step in step S235, all the space debris pieces D detected in the stacking processing step in step S233 are compared with the known space debris pieces D detected in the high-brightness debris detection step in step S231. Then, a space debris piece D detected only in the stacking processing step in step S233 is outputted as a detection result.

Here, it is also possible to output all the space debris pieces D detected in the stacking processing step in step S233 as the detection result in step S235 by omitting the high-brightness debris detection step in step S231. In this case, step S235 is no longer the step of exclusively outputting the low-brightness space debris piece D. In this context, step S235 represents a "debris detection step" instead of the "low-brightness debris detection step".

The procedures of the method of detecting space debris according to the embodiment have been described. The method of detecting space debris of this embodiment utilizes the debris breakup model as described above. As stated in connection with the explanation of step S3, the debris breakup model uses the random numbers for determining the area-to-mass ratio and the ejection velocity. For this reason, a group of fragments (the virtual space debris pieces D) thus determined is composed of an accidental combination. Such an accidental combination would be the most suitable method for observation if the combination reflects accurate calculation of actual breakup (the actual space debris pieces D). Nonetheless, this assumption is highly unlikely. As a consequence, simple adoption of the debris breakup model can only result in an observation plan for the space debris pieces D which leaves everything to chance.

To consider every possibility, it is essential to find necessities from many accidental combinations in regard to the area-to-mass ratio and the ejection velocity. An observation plan that enables detection of the space debris piece D at a high probability can be made on the basis of the necessities (the area-to-mass ratio and the ejection velocity) thus found. Moreover, if the necessities (the area-to-mass ratio and the ejection velocity) can be found, then it is possible to estimate an appropriate amount of motion (the motion vector p) possessed by the space debris piece D based on the necessities, which is important for surely detecting the space debris piece D having very low brightness (a low S/N ratio) from the images A1 to A4 captured at regular time intervals during the fixed point observation.

Accordingly, the embodiment is designed to estimate the motion vector p of the space debris piece D in the motion vector estimation step in step S17 of FIG. 3. To this end, the method of detecting space debris according to the embodiment includes the procedures of step S9 and step S15 of FIG. 3 by using the Monte Carlo method.

Specifically, each of the virtual debris generation step in step S3, the orbit calculation step in step S5, and the motion vector distribution generation step in step S13, which are necessary for estimating the motion vector p in step S17 of FIG. 3, is executed repeatedly for a predetermined number of times by way of confirmation in step S9 or step S15 (the Monte Carlo simulation).

In order to increase the probability that the actual space debris piece D appears on the images A1 to A4 captured during the fixed point observation, the embodiment is designed to obtain the existence probability distribution of the virtual space debris piece D at the respective time points during the fixed point observation by repeatedly executing each of the virtual debris generation step in step S3, the orbit calculation step in step S5, and the debris distribution generation step in step S7 for the predetermined number of times by way of confirmation in step S9 (the Monte Carlo simulation).

Then, the space (in terms of the right ascension and the declination) having a high level of the existence probability distribution of the virtual space debris piece D is set in the capturing space setting step in step S11 as the space for capturing the images A1 to A4 during the fixed point observation, on the basis of the cumulative distribution of the existence probability distribution of the virtual space debris piece D obtained by repeatedly executing step S3, step S5, and step S7.

Although this configuration may be omitted, it is possible to improve the probability that the actual space debris piece D appears on the images A1 to A4 captured during the fixed point observation by providing the configuration as in this embodiment.

According to the method of detecting space debris of the above-described embodiment, the space debris piece D having low brightness can be detected from the multiple images A1 to A4 of the observation space captured at time intervals during the fixed point observation, efficiently and with simple processing by using the stacking method.

Specifically, the appearance frequency distribution of the motion vector on the celestial sphere when each virtual space debris piece D moves on an orbit during fixed point observation in the future by executing the virtual debris generation step, the orbit calculation step, and the motion vector distribution generation step. If there is a motion vector having a high level of the appearance frequency distribution in the cumulative distribution of the appearance frequency of the motion vector obtained by performing the aforementioned steps multiple times, the motion vector is highly probable to be a motion vector of an actual space debris piece that moves during the fixed point observation.

Accordingly, it is possible to increase the probability to detect the space debris piece appearing on the images by cross-checking pieces of pixel information (accordance or discordance of pixel values of the same pixels) of the images captured at time intervals during the fixed point observation, while shifting the regions therein sequentially in the order of capture in the direction and in the amount of the motion vector of the virtual space debris piece having the high level of the appearance frequency distribution during the fixed point observation. Thus, the space debris piece can be detected from the multiple images of the observation space captured at time intervals during the fixed point observation efficiently and with the simple processing.

In addition, it is possible to increase the probability that pieces of the space debris piece appearing on the respective images are stacked on one another in the same pixels by applying the stacking method to the regions of the respective images captured at time intervals during the fixed point observation, the regions being sequentially shifted in the order of capture in the direction and in the amount of the search range vector set on the basis of the motion vector of the estimated space debris piece. Thus, the space debris piece can be detected from the multiple images of the observation space captured at time intervals during the fixed point observation efficiently and with the simple processing by using the stacking method.

Meanwhile, the search range vector is determined on the basis of the range having the high level of appearance frequency distribution of the motion vector of the virtual space debris piece particularly in the position on the celestial sphere where the virtual space debris piece is forecasted to exist during the fixed point observation.

Thus, it is possible to improve the probability that the motion vector of the actual space debris piece appearing on the multiple images captured during the fixed point observation coincides with the search range vector, thereby further improving the detection probability of the space debris piece.

Moreover, the existence probability distribution of each virtual space debris piece on the celestial sphere when the virtual space debris piece moves on the orbit during the fixed point observation in the future can be obtained by executing the virtual debris generation step, the orbit calculation step, and the debris distribution generation step. The region having the high level of the existence probability distribution of the virtual space debris piece on the celestial sphere during the fixed point observation obtained by executing the above-mentioned series of processing multiple times can be deemed as the region where the actual space debris piece is highly likely to exist during the fixed point observation.

Accordingly, it is possible to increase the probability that the actual space debris piece appears on the images captured at time intervals during the fixed point observation by setting the space including the region having the high level of the existence probability distribution of the virtual space debris piece on the celestial sphere during the fixed point observation as the space for capturing the images during the fixed point observation. Thus, the space debris piece can be detected from the multiple images of the observation space captured at time intervals during the fixed point observation efficiently and with the simple processing.

Meanwhile, the space for capturing the images during the fixed point observation is set to the space having the high level of the existence probability distribution of the virtual space debris piece, particularly in the position on the celestial sphere where the virtual space debris piece is forecasted to exist during the fixed point observation.

Accordingly, it is possible to improve the probability that the space for capturing the images during the fixed point observation coincides with the space where the actual space debris piece exists during the fixed point observation, thereby further improving the detection probability of the space debris piece while employing the stacking method.

In the meantime, the method of detecting space debris of this embodiment is extremely useful in view of a capability of enhancing a database of orbiting objects by newly registering the detected space debris piece D having low brightness with the database of orbiting objects.

The embodiment has described the case of detecting space debris piece by applying the stacking method to the images A1 to A4 captured at regular time intervals during the fixed point observation. However, the present invention is also applicable to a case of detecting the space debris piece D by employing an image processing method other than the stacking method, such as an optical flow according to a gradient method or a block matching method, to the images A1 to A4.

The invention claimed is:

1. A method of detecting space debris on a geocentric orbit, the space debris appearing on a plurality of images captured at time intervals during fixed point observation, the method comprising:
    an object identification step of identifying an object of breakup origin which is likely to have broken up on the geocentric orbit in the past;
    a virtual debris generation step of generating a virtual space debris piece in accordance with the law of conservation of mass by applying a debris breakup model to the object of breakup origin identified in the object identification step;
    an orbit calculation step of applying a debris orbit propagation model to each virtual space debris piece generated in the virtual debris generation step, thereby calculating an orbit of the virtual space debris piece during the fixed point observation;
    a motion vector distribution generation step of generating appearance frequency distribution of a motion vector of each virtual space debris piece on the celestial sphere during the fixed point observation on the basis of a result of the orbit calculation in the orbit calculation step;
    a motion vector estimation step of estimating the motion vector of the space debris piece on the images on the basis of a motion vector having a high level in the appearance frequency distribution on the basis of cumulative distribution of a plurality of appearance frequency distribution results of the motion vector obtained by performing the virtual debris generation step, the orbit calculation step, and the motion vector distribution generation step a plurality of times; and
    a detection step of cross-checking pieces of pixel information on respective regions in the images captured at time intervals during the fixed point observation, the regions shifted in a direction and in an amount of the estimated motion vector sequentially in the order of capture, thereby detecting space debris on the geocentric orbit appearing on the images.

2. The method of detecting space debris according to claim 1, further comprising:
    a search range vector setting step of setting a search range vector on the basis of the estimated motion vector, the search range vector indicating a direction of motion and an amount of motion of a search range for the space debris appearing on the images, wherein
    the detection step includes applying a stacking method to respective regions in the images captured at time intervals during the fixed point observation, the regions being shifted in a direction and in an amount of the set search range vector sequentially in the order of capture, thereby detecting space debris on the geocentric orbit appearing on the images.

3. The method of detecting space debris according to claim 2, wherein
    the orbit calculation step includes a time-based orbit calculation step of performing the orbit calculation of each virtual space debris piece generated in the virtual debris generation step for each of time points at regular time intervals in a period from start to end of the fixed point observation, and
    the motion vector distribution generation step generates the appearance frequency distribution of the motion vector on the basis of a result of the orbit calculation at the time points in the time-based orbit calculation step.

4. The method of detecting space debris according to claim 3, further comprising:
    a debris distribution generation step of generating existence probability distribution of each virtual space debris piece on the celestial sphere during the fixed point observation on the basis of the result of the orbit calculation in the orbit calculation step; and
    a capturing space setting step of setting a space including a region having a high level in the existence probability distribution of the virtual space debris piece on the celestial sphere during the fixed point observation as a space for capturing the images during the fixed point observation, on the basis of cumulative distribution of a plurality of existence probability distribution results obtained by performing the virtual debris generation step, the orbit calculation step, and the debris distribution generation step a plurality of times, wherein
    the images are obtained by capturing the set capturing space at time intervals.

5. The method of detecting space debris according to claim 4, wherein
    the orbit calculation step includes a time-based orbit calculation step of performing the orbit calculation of each virtual space debris piece generated in the virtual debris generation step for each of time points at regular time intervals in a period from start to end of the fixed point observation, and
    the debris distribution generation step includes:
    an existing position calculation step of calculating an existing position of each virtual space debris piece on the celestial sphere at each time point on the basis of the result of the orbit calculation at the time point in the time-based orbit calculation step; and
    an existence probability distribution generation step of generating existence probability distribution of each virtual space debris piece on the celestial sphere during the fixed point observation on the basis of the result of the calculation in the existing position calculation step.

6. The method of detecting space debris according to claim 2, further comprising:
    a debris distribution generation step of generating existence probability distribution of each virtual space debris piece on the celestial sphere during the fixed point observation on the basis of the result of the orbit calculation in the orbit calculation step; and a capturing space setting step of setting a space including a region having a high level in the existence probability distribution of the virtual space debris piece on the celestial sphere during the fixed point observation as a space for capturing the images during the fixed point observation, on the basis of cumulative distribution of a plurality of existence probability distribution results obtained by performing the virtual debris generation step, the orbit calculation step, and the debris distribution generation step a plurality of times, wherein the images are obtained by capturing the set capturing space at time intervals.

7. The method of detecting space debris according to claim 6, wherein the orbit calculation step includes a time-based orbit calculation step of performing the orbit calculation of each virtual space debris piece generated in the virtual debris generation step for each of time points at regular time intervals in a period from start to end of the fixed point observation, and the debris distribution generation step includes:

an existing position calculation step of calculating an existing position of each virtual space debris piece on the celestial sphere at each time point on the basis of the result of the orbit calculation at the time point in the time-based orbit calculation step; and an existence probability distribution generation step of generating existence probability distribution of each virtual space debris piece on the celestial sphere during the fixed point observation on the basis of the result of the calculation in the existing position calculation step.

8. The method of detecting space debris according to claim 1, wherein the orbit calculation step includes a time-based orbit calculation step of performing the orbit calculation of each virtual space debris piece generated in the virtual debris generation step for each of time points at regular time intervals in a period from start to end of the fixed point observation, and the motion vector distribution generation step generates the appearance frequency distribution of the motion vector on the basis of a result of the orbit calculation at the time points in the time-based orbit calculation step.

9. The method of detecting space debris according to claim 8, further comprising:

a debris distribution generation step of generating existence probability distribution of each virtual space debris piece on the celestial sphere during the fixed point observation on the basis of the result of the orbit calculation in the orbit calculation step; and a capturing space setting step of setting a space including a region having a high level in the existence probability distribution of the virtual space debris piece on the celestial sphere during the fixed point observation as a space for capturing the images during the fixed point observation, on the basis of cumulative distribution of a plurality of existence probability distribution results obtained by performing the virtual debris generation step, the orbit calculation step, and the debris distribution generation step a plurality of times, wherein the images are obtained by capturing the set capturing space at time intervals.

10. The method of detecting space debris according to claim 9, wherein the orbit calculation step includes a time-based orbit calculation step of performing the orbit calculation of each virtual space debris piece generated in the virtual debris generation step for each of time points at regular time intervals in a period from start to end of the fixed point observation, and the debris distribution generation step includes:

an existing position calculation step of calculating an existing position of each virtual space debris piece on the celestial sphere at each time point on the basis of the result of the orbit calculation at the time point in the time-based orbit calculation step; and an existence probability distribution generation step of generating existence probability distribution of each virtual space debris piece on the celestial sphere during the fixed point observation on the basis of the result of the calculation in the existing position calculation step.

11. The method of detecting space debris according to claim 1, further comprising:

a debris distribution generation step of generating existence probability distribution of each virtual space debris piece on the celestial sphere during the fixed point observation on the basis of the result of the orbit calculation in the orbit calculation step; and a capturing space setting step of setting a space including a region having a high level in the existence probability distribution of the virtual space debris piece on the celestial sphere during the fixed point observation as a space for capturing the images during the fixed point observation, on the basis of cumulative distribution of a plurality of existence probability distribution results obtained by performing the virtual debris generation step, the orbit calculation step, and the debris distribution generation step a plurality of times, wherein the images are obtained by capturing the set capturing space at time intervals.

12. The method of detecting space debris according to claim 11, wherein the orbit calculation step includes a time-based orbit calculation step of performing the orbit calculation of each virtual space debris piece generated in the virtual debris generation step for each of time points at regular time intervals in a period from start to end of the fixed point observation, and the debris distribution generation step includes:

an existing position calculation step of calculating an existing position of each virtual space debris piece on the celestial sphere at each time point on the basis of the result of the orbit calculation at the time point in the time-based orbit calculation step; and an existence probability distribution generation step of generating existence probability distribution of each virtual space debris piece on the celestial sphere during the fixed point observation on the basis of the result of the calculation in the existing position calculation step.

* * * * *